(12) United States Patent
Lai

(10) Patent No.: US 10,025,397 B1
(45) Date of Patent: Jul. 17, 2018

(54) COMPUTER MOUSE WITH QUICK-REPLACEABLE MICRO-SWITCH

(71) Applicants: DEXIN ELECTRONIC LTD., Donggaun Guangdong (CN); DEXIN CORPORATION, New Taipei (TW)

(72) Inventor: Yen-Yao Lai, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/464,549

(22) Filed: Mar. 21, 2017

(51) Int. Cl.
```
G09G 5/08      (2006.01)
G06F 3/0354    (2013.01)
H01H 13/14     (2006.01)
H01H 13/04     (2006.01)
```

(52) U.S. Cl.
CPC ......... *G06F 3/03543* (2013.01); *H01H 13/04* (2013.01); *H01H 13/14* (2013.01)

(58) Field of Classification Search
CPC .. G06F 3/03543; G06F 2203/0332–2203/0337
USPC .................................................. 345/156–169
See application file for complete search history.

(56) References Cited

U.S. PATENT DOCUMENTS

| 6,459,421 B1* | 10/2002 | Cho ...................... G06F 1/1616 345/163 |
| 6,522,321 B1* | 2/2003 | Chen ................... G06F 3/03543 345/156 |
| 2009/0073122 A1* | 3/2009 | Hou ...................... G06F 3/0304 345/163 |

FOREIGN PATENT DOCUMENTS

| TW | 200605118 A | 2/2006 |
| TW | 200707261 A | 2/2007 |
| TW | 200937264 A | 9/2009 |
| TW | 201430629 A | 8/2014 |
| TW | M527122 U | 8/2016 |

\* cited by examiner

*Primary Examiner* — Stacy Khoo
(74) *Attorney, Agent, or Firm* — Li & Cai Intellectual Property (USA) Office

(57) ABSTRACT

A computer mouse with quick-replaceable micro-switch includes a main body, a switch holder, a micro-switch and a covering panel. The main body has a lower housing, an upper housing, and an accommodation chamber formed therein. The accommodation chamber is formed with an opening on a top portion thereof. A circuit board is disposed in the main body, and has a plurality of conducting members. The switch holder is disposed in the accommodation chamber of the main body. The micro-switch is received in a receiving space of the switch holder, and has a plurality of terminals which are contacted with the conducting members. When the covering panel is removed, the micro-switch in the receiving space of the switch holder can be replaced quickly from the opening. Therefore, a user can replace the micro-switch quickly to adjust a tactile sensation when pressing the button according to personal needs.

10 Claims, 8 Drawing Sheets

COMPUTER MOUSE WITH QUICK-REPLACEABLE MICRO-SWITCH

BACKGROUND OF THE INVENTION

1. Field of the Invention

The present invention is related to a computer mouse. In particular, the present disclosure relates to a computer mouse with a micro-switch that is quickly replaceable.

2. Description of Related Art

Keyboards and computer mice are the most commonly-used input devices for computers. A conventional computer mouse usually has a left button, a right button and a scroll wheel between the left and right buttons. The buttons are movably disposed on a main body of the computer mouse in an up-and-down manner. A triggering portion is disposed on an inner side of the button and arranged above a micro-switch. When the button is pressed, the micro-switch can be activated by the triggering portion.

With the increasing popularity of video games, game fans share experiences and exchange game tips through livestreams, which draws public attention. Players who possess superb gameplay mechanics or strategy often choose a career in video games, i.e. competitive players. Over the years, video games have evolved toward competitive play, and a mouse is often clicked hundreds of times throughout the span of just one game.

However, a micro-switch of the conventional computer mouse is typically fixed in an immovable manner and fixedly mounted in the computer mouse, so that the micro-switch cannot be easily replaced. The tactile sensation when pressing the mouse buttons cannot be adjusted according to personal needs. In addition, the buttons have no weight-loading variations in tactility.

The abovementioned drawbacks of the conventional computer mouse seem to suggest that there is still room for improvement in the art.

SUMMARY OF THE INVENTION

One objective of the present disclosure is to provide a computer mouse with a quick-replaceable micro-switch, so that the micro-switch can be quickly replaced by a user to adjust the tactile sensation when pressing a mouse button according to personal needs, thereby providing different weight-loading in button tactility.

In order to achieve the above objectives, the present disclosure is to provide a computer mouse with a quick-replaceable micro-switch, which includes a main body, a switch holder, a micro-switch and a covering panel. The main body has a lower housing, an upper housing which is disposed on the lower housing, an accommodating chamber which is formed between the lower housing and the upper housing, and an opening which is formed on a top of the accommodating chamber. A circuit board is disposed in the main body, and has a plurality of conducting members. The switch holder is disposed in the main body, and in the accommodating chamber. The switch holder has a receiving space. The micro-switch is received in the receiving space of the switch holder. The micro-switch has a plurality of terminals. The terminals protrude beyond a bottom surface of the micro-switch. The terminals contact the conducting members so that the micro-switch is electrically connected to the circuit board. The covering panel is dismountably disposed on the upper housing of the main body. One end of the covering panel is formed with a button. The button is movably disposed on the covering panel. An inner side of the button has an actuating post. The actuating post is disposed on the micro-switch. The micro-switch in the receiving space of the switch holder is replaceable through the opening when the covering panel is removed.

Thus, the present disclosure has advantages as follows. When the user wishes to replace the micro-switch, the covering panel is firstly removed to expose the accommodating chamber of the main body, the switch holder and the micro-switch, and then the user takes out the micro-switch by a pincer.

Thus, the user can replace the micro-switch quickly, and the tactile sensation when pressing the button can be adjusted according to personal needs. In addition, the user can replace the micro-switch when the life span of the micro-switch expires, so that there is no need to discard the entire computer mouse.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE EXEMPLARY EMBODIMENTS

Figure 1:
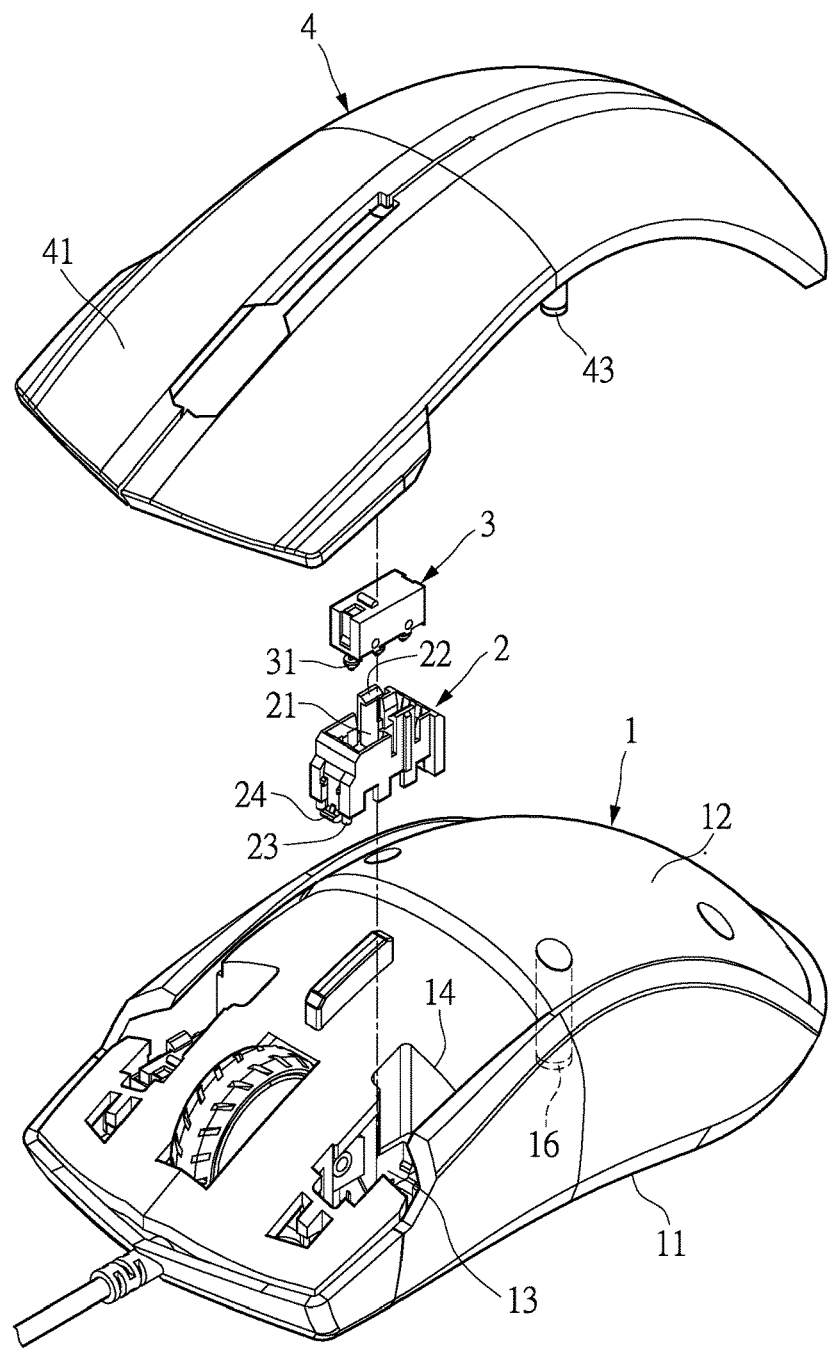
FIG. 1 is an exploded perspective view of a computer mouse according to a first embodiment of the present disclosure.
Figure 2:
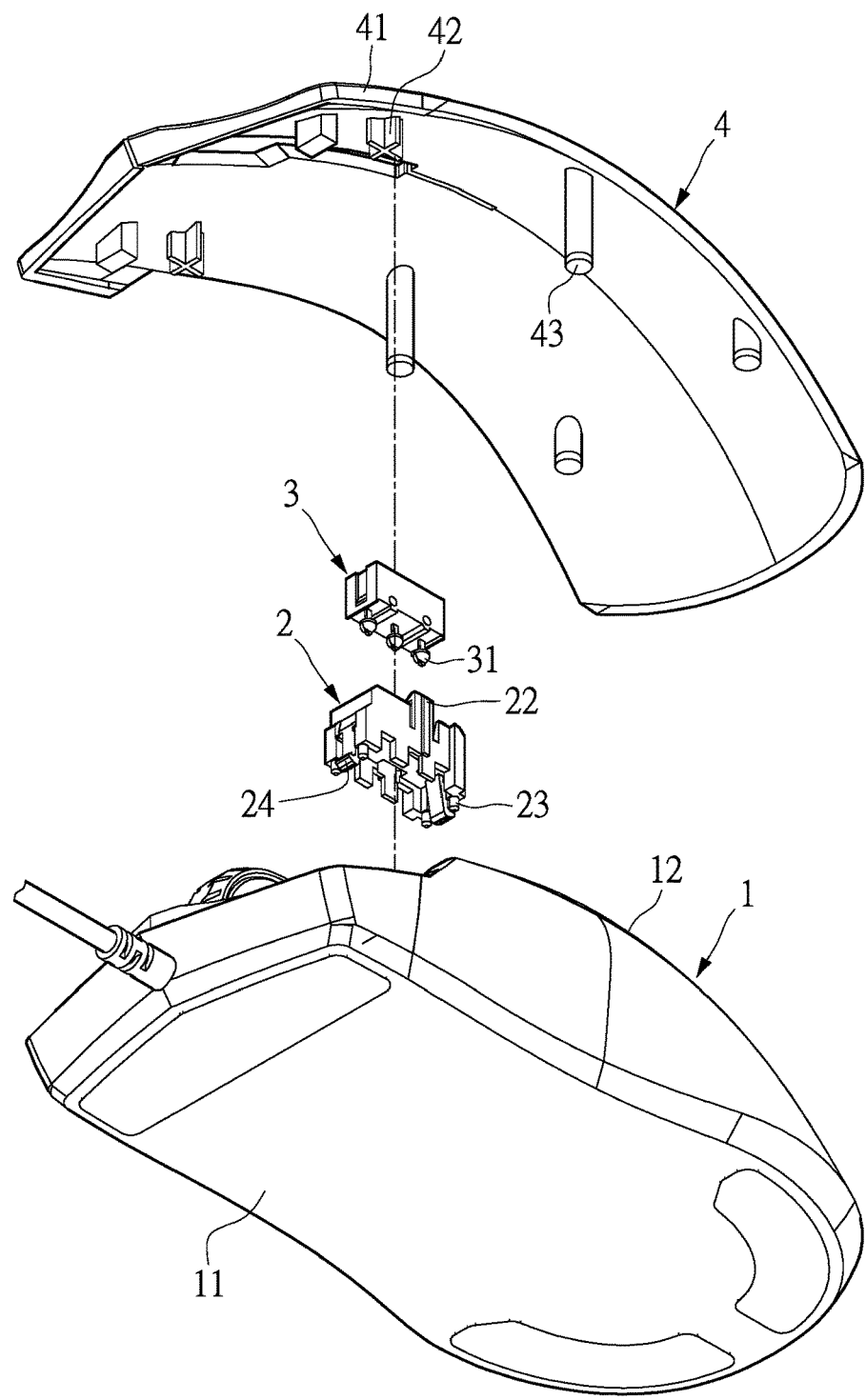
FIG. 2 is another exploded perspective view of the computer mouse of the present disclosure.
Figure 3:
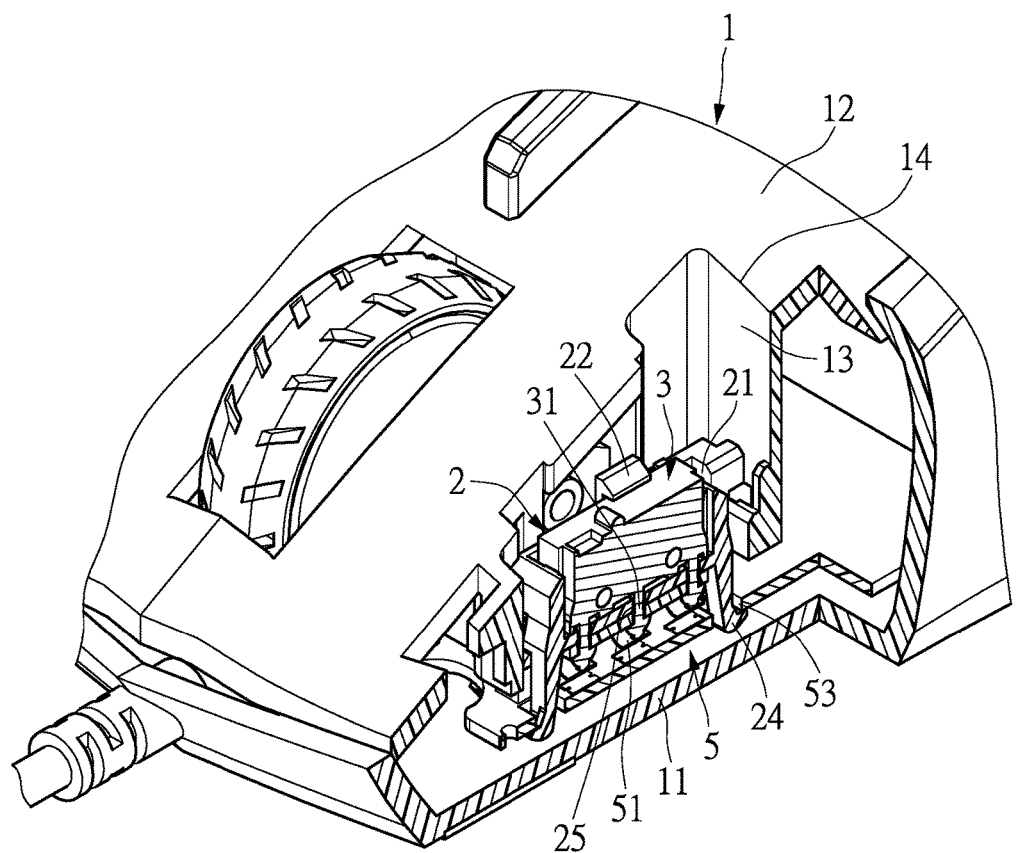
FIG. 3 is a cross-sectional view of the computer mouse of the present disclosure.
Figure 4:
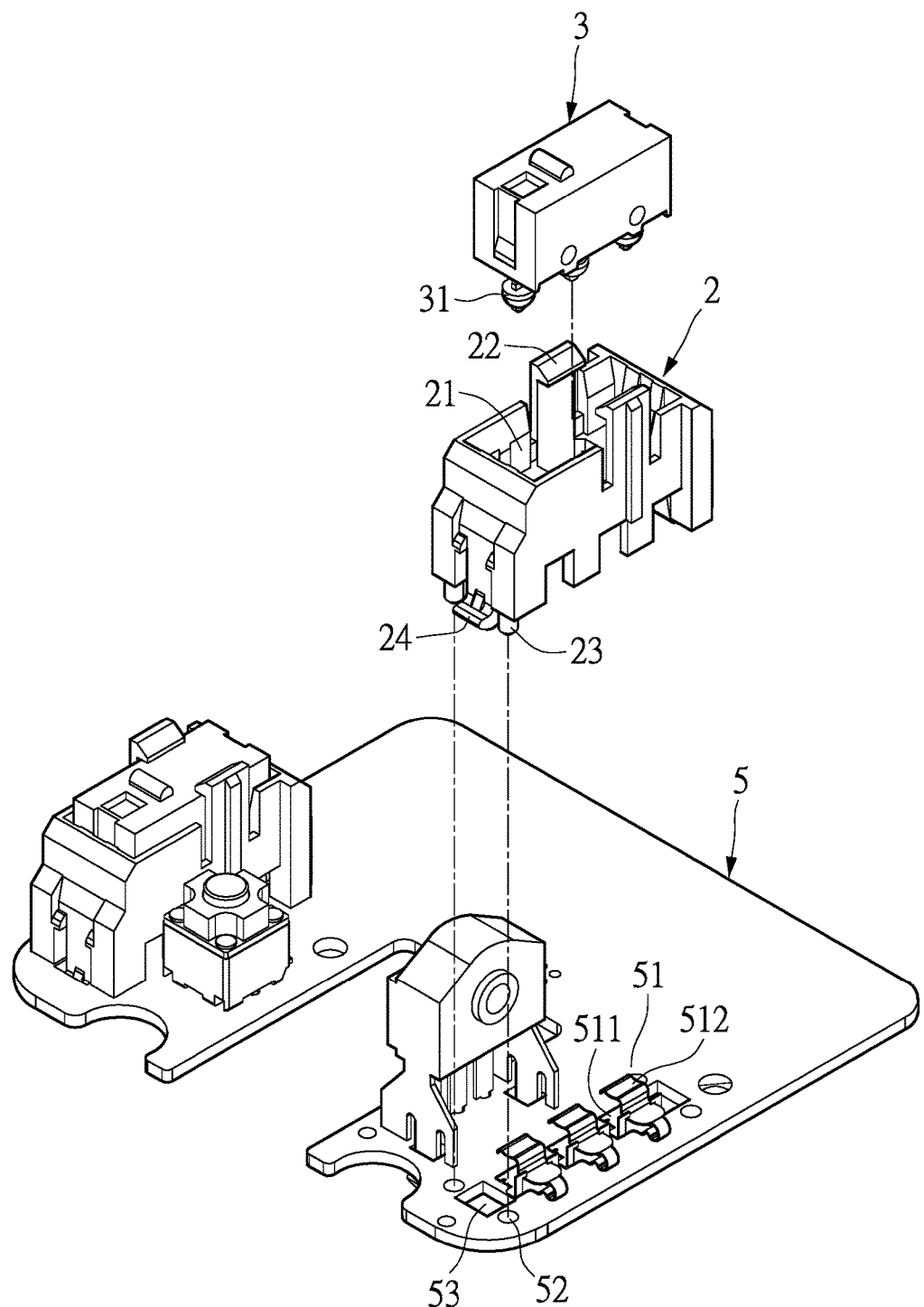
FIG. 4 is a partial exploded perspective view of the computer mouse of the present disclosure.

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Referring to FIG. 1 to FIG. 4, the present disclosure provides a computer mouse with a quick-replaceable micro-switch, which includes a main body 1, a switch holder 2, a micro-switch 3 and a covering panel 4.

The main body 1 is a hollow housing which can receive elements such as the switch holder 2, the micro-switch 3, etc. The main body 1 can be a one piece or multiple piece structure, but is not limited thereto. The main body 1 has a lower housing 11 and an upper housing 12. The lower housing 11 and the upper housing 12 are respectively disposed at a lower position and a higher position of the main body 1. In other words, the upper housing 12 is disposed on the lower housing 11. In addition, the lower housing 11 and the upper housing 12 can be connected in one piece integrally, or be combined to each other in a wedge or screw manner. A circuit board 5 is disposed in the main body 1. The main body 1 is further equipped with elements to function as a common computer mouse, such as an optical reading module and a scroll wheel . . . etc. Such elements are not features that require emphasis, and are hence not described herein.

The switch holder 2 is disposed in the main body 1. The switch holder 2 can be disposed on the circuit board 5 or other appropriate positions in the main body 1. The switch holder 2 can be a square socket, and a receiving space 21 is formed in the switch holder 2. In this embodiment, the receiving space 21 is a square slot corresponding to the micro-switch 3, and the receiving space 21 is opened on a top of the switch holder 2. Thus, the micro-switch 3 can be received in the receiving space 21. In this embodiment, the switch holder 2 has two sides, and each side has a first elastic hook 22. When the micro-switch 3 is installed in the receiving space 21, the two first elastic hooks 22 can hold a top of the micro-switch 3, so as to fix the micro-switch 3 stably in the switch holder 2.

A bottom of the switch holder 2 has a plurality of fixing pins 23, and the fixing pins 23 are protruded out of the bottom of the switch holder 2. The circuit board 5 is formed with a plurality of fixing holes 52. The fixing pins 23 can be inserted into the fixing holes 52, so that the switch holder 2 is dismountably disposed on the circuit board 5, and the switch holder 2 can be stably positioned on the circuit board 5.

The main body 1 has an accommodating chamber 13 between the lower housing 11 and the upper housing 12. A top of the accommodating chamber 13 is formed with an opening 14, so that the accommodating chamber 13 can be communicated with the exterior environment through the opening 14. The switch holder 2 is disposed in the accommodating chamber 13. In this embodiment, the switch holder 2 has two other sides, and each other side has a second elastic hook 24. The circuit board 5 has two engaging portions 53 which correspond to the two second elastic hooks 24. In this embodiment, the engaging portion 53 is an engaging type hole, and the two second elastic hooks 24 can be hooked with the two engaging portions 53, so that the switch holder 2 is dismountably fixed in the main body 1.

The micro-switch 3 is received in the receiving space 21 of the switch holder 2, so that the micro-switch 3 is installed in the switch holder 2. By installing the micro-switch 3 in the switch holder 2, the switch holder 2 fixes the micro-switch 3 stably in the main body 1. The micro-switch 3 has a plurality of terminals 31, and the terminals 31 are protruded out of a bottom of the micro-switch 3. The bottom of the switch holder 2 is formed with a plurality of through holes 25. The terminals 31 pass through the through holes 25, so that the terminals 31 are protruded out of the bottom the switch holder 2. Therefore, the terminals 31 can be electrically coupled with the circuit board 5.

The circuit board 5 is formed with a plurality of conducting members 51, and the conducting members 51 correspond to the terminals 31. The terminals 31 are contacted with the conducting members 51, so that the micro-switch 3 can be electrically coupled to the circuit board 5 by the terminals 31 and the conducting members 51. The conducting members 51 are not limited by the illustrated structure. In this embodiment, the conducting members 51 are elastic metal sheets. Each conducting member 51 has a soldering portion 511 and a contacting portion 512. The soldering portion 511 can be soldered fixedly on the circuit board 5, so that the conducting member 51 can be electrically coupled with the circuit board 5. The terminals 31 of the micro-switch 3 can contact with the contacting portions 512 of the conducting member 51, so that the terminals 31 can be electrically coupled with the conducting members 51. In this embodiment, the switch holder 2 and the micro-switch 3 can be dismounted from and assembled in the main body 1 together.

The covering panel 4 is dismountably disposed on the upper housing 12 of the main body 1, that is, the covering panel 4 can be arranged above the upper housing 12 of the main body 1. The covering panel 4 can be assembled to the upper housing 12 of the main body 1 by magnetic, screw, or hooking manners. In this embodiment, the covering panel 4 has a first magnetic member 43, and the upper housing 12 has a second magnetic member 16. The first magnetic member 43 and the second magnetic member 16 can be magnets which are attracted to each other, or a magnet and a metal piece which are attracted to each other. The first magnetic member 43 and the second magnetic member 16 are connected in a magnetic manner, so that the covering panel 4 can be assembled to the upper housing 12 of the main body 1, and the covering panel 4 can be dismounted quickly.

The covering panel 4 has one end being formed with buttons 41. The buttons 41 are movably disposed on the covering panel 4 in an up-and-down manner. The buttons 41 can be arranged on a front end of the upper housing 12 of the main body 1. An inner side of the button 41 is formed with an actuating post 42. The actuating post 42 is disposed on the micro-switch 3. When the button 41 is pressed, the actuating post 42 is used to trigger the micro-switch 3. In this embodiment, the switch holder 2, the micro-switch 3 and the button 41 can each have left and right sets. However, the numbers of the switch holder 2, the micro-switch 3 and the button 41 are not limited thereto.

Figure 5:
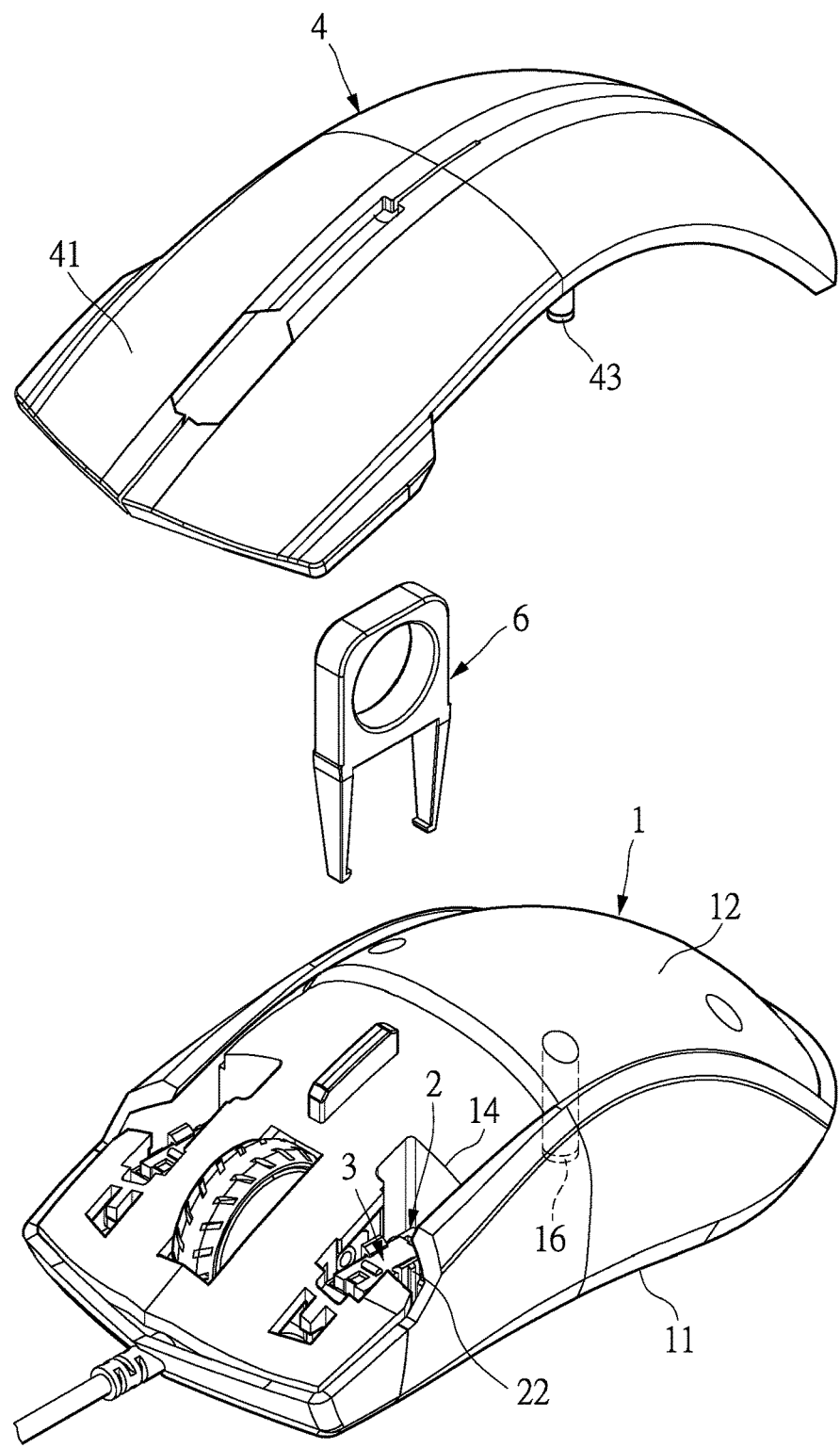
FIG. 5 is a perspective view of replacing a micro-switch of the computer mouse of the present disclosure.
Figure 6:
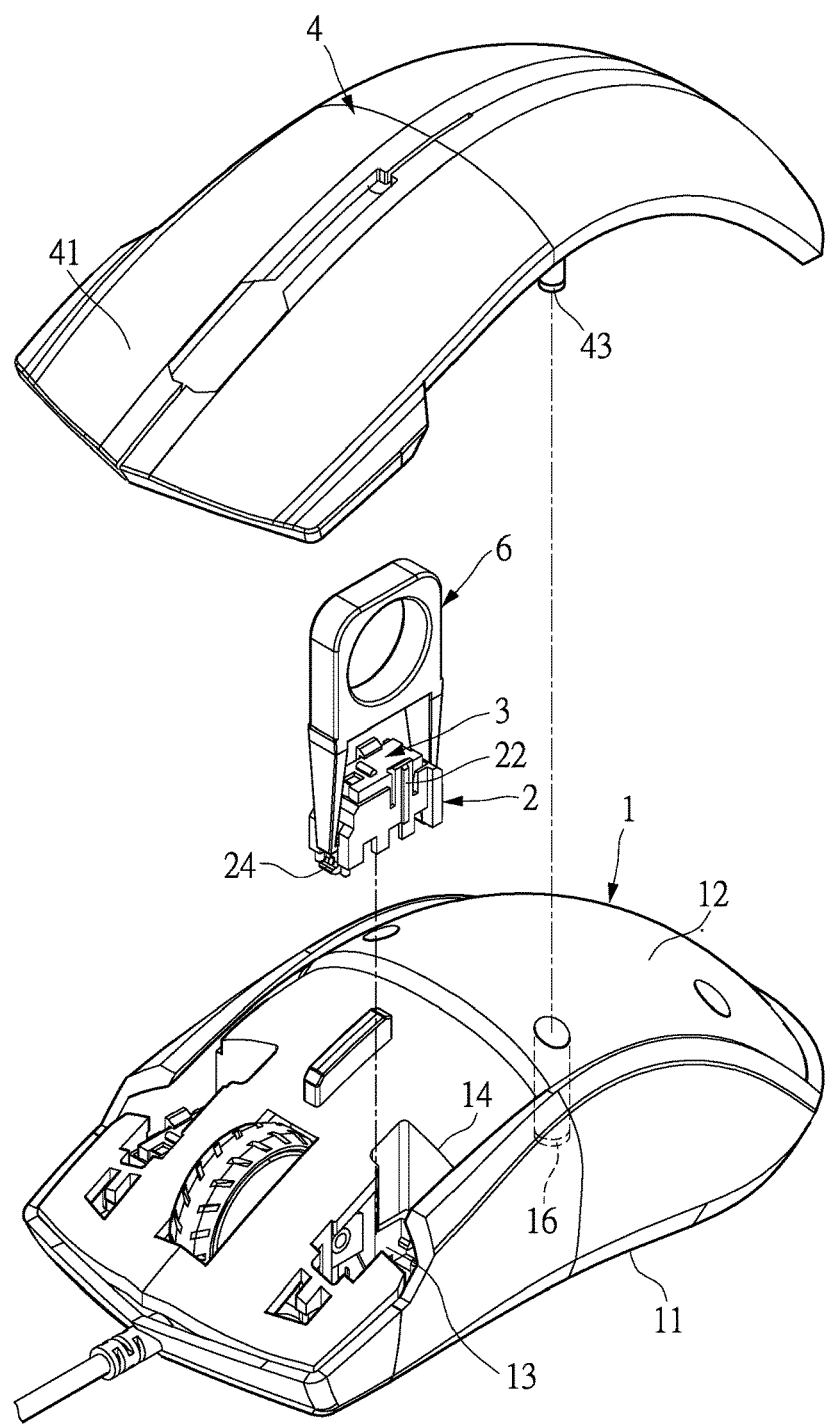
FIG. 6 is a perspective view of a micro-switch being dismounted from the computer mouse of the present disclosure.

Referring to FIG. 5 and FIG. 6, when a user wishes to replace the micro-switch 3, the covering panel 4 is first removed, so that the accommodating chamber 13 of the main body 1, the switch holder 2 and the micro-switch 3 are exposed. The user can take out the micro-switch 3 by using a pincer 6. In this embodiment, the pincer 6 can be used to pinch out the switch holder 2 and the micro-switch 3 together. When the pincer 6 pinches the switch holder 2, the second elastic hooks 24 on two sides of the switch holder 2 can be pressed inward, such that the second elastic hooks 24 can be separated from the engaging portions 53. Thus, the switch holder 2 and the micro-switch 3 can be smoothly taken out from the main body 1.

Accordingly, the user can quickly replace the micro-switch 3, so as to adjust the tactile sensation of the button 41 according to personal needs. Computer mice can thereby provide different tactile sensations upon pressing of the button 41. In addition, the user can replace the micro-switch 3 when the life span of the micro-switch has expired, instead of having to discard the entire computer mouse.

Second Embodiment

Figure 7:
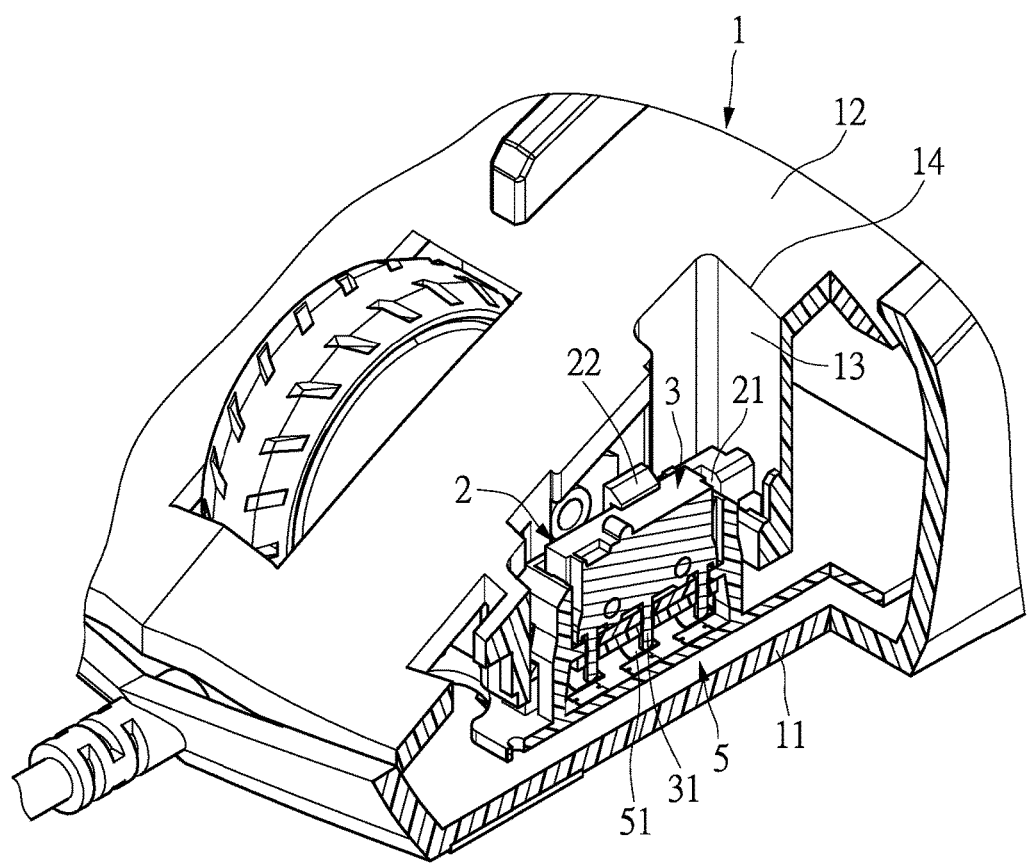
FIG. 7 is a cross-sectional view of the computer mouse according to a second embodiment of the present disclosure.

Referring to FIG. 7, in this embodiment, the switch holder 2 is fixedly disposed on the circuit board 5, that is, the switch holder 2 can be fixed on the circuit board 5 in an integral manner. When the user wishes to replace the micro-switch 3, the covering panel 4 is first removed, and then the micro-switch 3 can be taken out independently by the pincer or other devices, so that the user can quickly replace the micro-switch 3. In this embodiment, the switch holder 2 is fixedly disposed in the main body 1, and the micro-switch 3 can be independently dismounted from or assembled to the main body 1.

Third Embodiment

Figure 8:
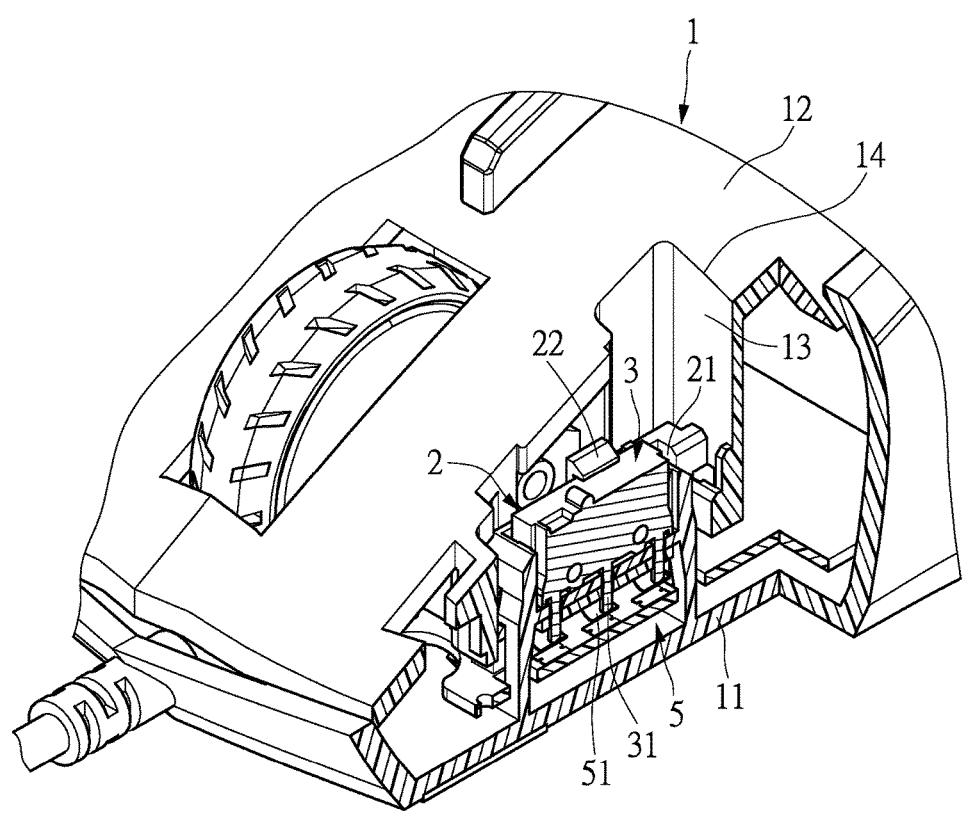
FIG. 8 is a cross-sectional view of the computer mouse according to a third embodiment of the present disclosure.

Referring to FIG. 8, in this embodiment, the switch holder 2 is disposed on the lower housing 11 of the main body 1. The switch holder 2 can be disposed on the lower housing 11 of the main body 1 in a fixed manner or in a dismountable manner. When the user wishes to replace the micro-switch 3, the covering panel 4 is first removed, and the micro-switch 3, or the switch holder 2 and the micro-switch 3 together, can be taken out by the pincer. Thus, the user can quickly replace the micro-switch 3.

The descriptions illustrated supra set forth simply the preferred embodiments of the present disclosure; however, the characteristics of the present disclosure are by no means restricted thereto. All changes, alterations or modifications conveniently considered by those skilled in the art are deemed to be encompassed within the scope of the present disclosure delineated by the following claims.

What is claimed is:

1. A computer mouse with quick-replaceable micro-switch, comprising:
   a main body, having a lower housing, an upper housing disposed above the lower housing, and an accommodating chamber formed between the lower housing and the upper housing; wherein an opening is formed on a top of the accommodating chamber;
   a circuit board, disposed in the main body, and having a plurality of conducting members disposed thereon;
   a switch holder, disposed in the accommodating chamber of the main body, and having a receiving space formed therein;
   a micro-switch, disposed in the receiving space of the switch holder, and having a plurality of terminals, wherein the terminals protrude out of a bottom of the micro-switch and contact with the conducting members, so that the micro-switch is electrically coupled with the circuit board;
   a covering panel, dismoutably disposed on the upper housing of the main body, and having a button formed on one end thereof and an actuating post formed on an inner side of the button, wherein the button is movably disposed on the covering panel, and the actuating post is disposed on the micro-switch; and
   wherein the micro-switch in the receiving space of the switch holder is able to be replaced through the opening when the covering panel is removed.

2. The computer mouse with quick-replaceable micro-switch as claimed in claim 1, wherein the switch holder is dismountably disposed on the circuit board.

3. The computer mouse with quick-replaceable micro-switch as claimed in claim 2, wherein the switch holder has a plurality of fixing pins formed on a bottom surface thereof, and the circuit board is formed with a plurality of fixing holes, the fixing pins being respectively inserted in the fixing holes.

4. The computer mouse with quick-replaceable micro-switch as claimed in claim 1, wherein the switch holder is disposed on the circuit board fixedly.

5. The computer mouse with quick-replaceable micro-switch as claimed in claim 1, wherein the switch holder is fixedly or dismountably disposed on the lower housing of the main body.

6. The computer mouse with quick-replaceable micro-switch as claimed in claim 1, wherein the switch holder has two sides, and each side has a first elastic hook, the two first elastic hooks being engaged with a top of the micro-switch.

7. The computer mouse with quick-replaceable micro-switch as claimed in claim 6, wherein the switch holder has two other sides, and each other side has a second elastic hook; wherein the circuit board has two engaging portions, and the two second elastic hooks are engaged with the two engaging portions.

8. The computer mouse with quick-replaceable micro-switch as claimed in claim 1, wherein the switch holder has a plurality of through holes formed on a bottom surface thereof, and the terminals pass through the through holes, so that the terminals protrude out of the bottom of the switch holder.

9. The computer mouse with quick-replaceable micro-switch as claimed in claim 1, wherein the covering panel has a first magnetic member, and the upper housing has a second magnetic member; wherein the first magnetic member and the second magnetic member are connected in a magnetic manner.

10. The computer mouse with quick-replaceable micro-switch as claimed in claim 1, wherein the conducting members are elastic metal sheets, and each of the conducting members has a soldering portion and a contacting portion; wherein the soldering portions are soldered fixedly on the circuit board, and the terminals of the micro-switch are contacted with the contacting portions of the conducting member.

* * * * *